US006609149B1

United States Patent
Bandera et al.

(10) Patent No.: US 6,609,149 B1
(45) Date of Patent: Aug. 19, 2003

(54) METHOD AND APPARATUS FOR PRIORITIZING VIDEO FRAME RETRIEVAL IN A SHARED DISK CLUSTER

(75) Inventors: Daniel Quinto Bandera, Austin, TX (US); David Jones Craft, Austin, TX (US); Wade David Shaw, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/289,887

(22) Filed: Apr. 12, 1999

(51) Int. Cl.[7] ............................................... G06F 15/16
(52) U.S. Cl. ...................... 709/219; 710/58; 714/12; 725/87
(58) Field of Search .................................. 709/219, 217, 709/218; 710/58, 60, 61; 725/87, 93, 96; 714/12

(56) References Cited

U.S. PATENT DOCUMENTS 5,787,482 A * 7/1998 Chen et al. ................. 711/158
5,835,843 A * 11/1998 Haddad ....................... 455/4.2
5,944,792 A * 8/1999 Yamato et al. ............... 709/219
6,061,504 A * 5/2000 Tzelnic et al.
6,263,411 B1 * 7/2001 Kamel et al. ................ 711/167

* cited by examiner

Primary Examiner—Emanuel Todd Voeltz
(74) Attorney, Agent, or Firm—Casimer K. Salys; Bracewell & Patterson, L.L.P.

(57) ABSTRACT

A first frame deadline is calculated and attached to an I/O request for prioritizing and retrieving video data frames from a shared disk cluster. Disk adapters queue video data frame requests according to the deadline incorporated in the frame requests. Data frames are transmitted to a requesting end user utilizing the attached deadline time to schedule the frames according to a time priority. Alternatively, a "slack" time is computed and utilized to determine when the first frame and subsequent frames of the requested video data may be retrieved from disk and present in the video server's memory in order to avoid a visible delay in sending that frame to the end user.

18 Claims, 4 Drawing Sheets

METHOD AND APPARATUS FOR PRIORITIZING VIDEO FRAME RETRIEVAL IN A SHARED DISK CLUSTER

BACKGROUND OF THE INVENTION

1. Technical Field

The present invention relates in general, to video servers and in particular to shared disk clusters of video servers within a video on demand (VOD) system. More particularly, the present invention relates to video frame retrieval from shared disk clusters in a VOD system. Still more particularly, the present invention relates to out of order video frame retrieval requests from multiple video servers.

2. Description of the Related Art

A VOD system typically includes ac storage server, a controller, a communications network and customer stations. Multiple videos are stored in digital form on a storage server and transmitted, or played out, to an end user—at the user's station—upon request. An end user would select an available movie (stored on the storage server) and the controller would transmit the selected movie over the communications network to the customer's station.

In order to cost-effectively meet customer demand, video storage servers are usually required to provide multiple current streams of multimedia data (i.e., videos) at the same time. During normal playout, data blocks containing ordered frames of the multimedia stream are retrieved from a storage system and transmitted to the receiving station (that of the end user). The receiving station decodes the incoming multimedia stream and plays it out. The receiving station is usually connected to the VOD service via a network and either cable or satellite. Within the VOD service the movies may be stored on hard disk drives, usually shared disk storage. Many shared disk storage systems are very large and provide data block feeds for multiple servers.

During normal playout, media (video) segments are retrieved (I/O request) by a video server, buffered in memory and then transmitted at a fixed rate to the receiving station. In shared-disk clusters of video servers, disk contention can result in poor video quality when disk requests are prioritized without reference to first video frame deadlines. While a single video server can control the order of issue of I/O requests, requests out of deadline order may be received by disks shared by multiple servers. This increases the probability that video frames will be dropped and the image quality of the video suffers.

Current shared disk subsystems nominally select the order that I/O (input/output) requests are satisfied by examining a queue of requests and ordering them in a scheme that will produce the minimum amount of disk drive read head movement. This is often referred to as an "elevator" algorithm where the disk drive head takes the next read closest to the current position of the drive head.

With the advent of real time data delivery, elevator algorithms are found to be counter productive to video timing requirements. For instance, requests that must be satisfied immediately may be ordered by the algorithm in a lower priority slot in lieu of requests whose disk address happens to be closer to the current disk head position.

Real time data delivery software often must compensate for elevator algorithms by either requesting one I/O at a time or turning off the elevator algorithm and making requests in priority order. For a multi-node system where multiple machines are requesting data from a single pool of disks, contention for transmit order may cause large variances in retrieval times from buffers of frames from shared disks, resulting in the transmitted video being perceived by the user as poor quality reception.

Therefore, it would be desirable to provide a method and apparatus that would improve the prioritizing of video data requests and reduce dropped video frames, which are seen by the viewer as poor quality television images.

SUMMARY OF THE INVENTION

It is therefore one object of the present invention to provide a method and apparatus for transmitting video data frames with no visible delay between data frames.

It is another object of the present invention to provide a method and apparatus for determining accurate times for prioritizing data frame disk reads associated with multiple video streams originating from a plurality of video servers.

It is yet another object of the present invention to provide a method and apparatus for which provides higher disk read rates with fewer missed frame deadlines, and requiring less memory buffering.

The foregoing objects are achieved as is now described. A first frame deadline is calculated and attached to an I/O request for prioritizing and retrieving video data frames from a shared disk cluster. Disk adapters queue video data frame requests according to the deadline incorporated in the frame requests. Data frames are transmitted to a requesting end user utilizing the attached deadline time to schedule the frames according to a time priority. Alternatively, a "slack" time until deadline is computed and utilized to determine the order in which the first frame and subsequent frames of the requested video data may be retrieved from disk to be present in the video server's memory in order to avoid a visible delay in sending that frame to the end user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
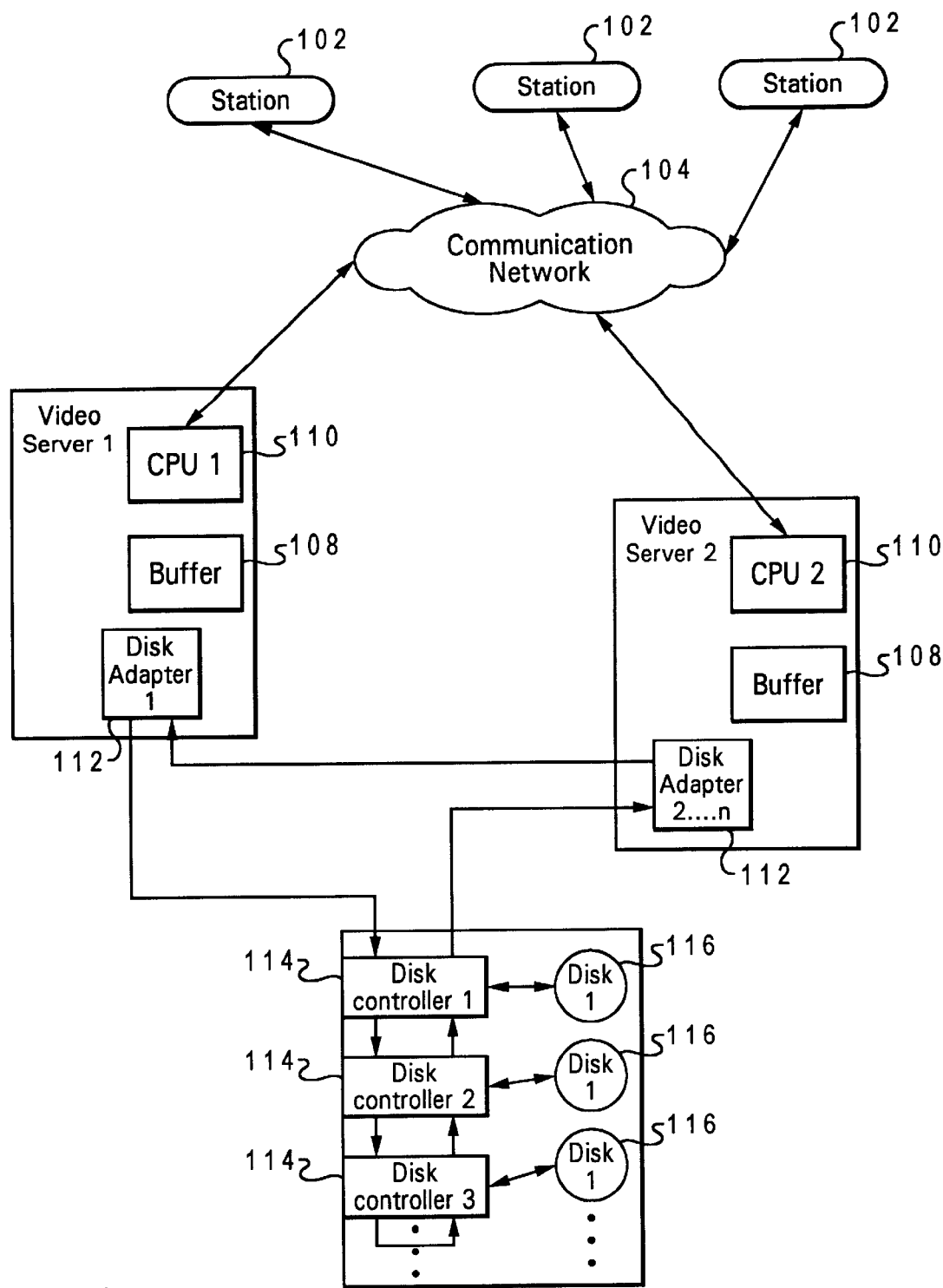
FIG. 1 depicts a high-level block diagram of a video on demand system in which a preferred embodiment of the present invention may be implemented.

With reference now to the figures, and in particular with reference to FIG. 1, a high-level block diagram of a video on demand system in which a preferred embodiment of the present invention may be implemented, is depicted. As depicted, video on demand system 100 includes end user stations 102, communication network 104 which may be a two-way cable television network, a telephone network, another wide-area network or local area network. Connected to communications network 104 is video server 106. Video server 106 includes memory buffer 108, Computer processing Unit (CPU) 110, disk adapter 112, disk controller 114, and shared disk cluster 116. Multiple disk drives (not shown) within disk cluster 116 store video data for multiple videos. Disk controller 114 controls reading and writing of data to the disk drives in disk cluster 116. Video data which is read from disk drives within disk cluster 116 is output from storage server 106 to communication network 104. The video data is then received by end user stations 102.

Depending on the size of a VOD system there may be multiple video servers and the objective of a VOD system is to provide each end user with the video data requested by that end user. Video data is retrieved, on request, by disk controllers 114 from disk cluster 116. The data is then sent to disk adapter 112 within Video Server 1 or 2. The data stream is smoothed out, using buffer memory 108 and subsequently transmitted in a continuous stream by CPU 1 or 2 110 to user station 102 via communications network 104.

As indicated above, the video server is connected to a set of shared disks and streams multiple video channels to viewers by reading video data blocks from disk drives within shared disk cluster drive. Multiple viewers may be connected at any time and multiple video channels may be transmitted from the same server at the same time.

Transmitting video data blocks to end user stations is time critical. An end user sends a request for a video stream (movie) and the movie may be stored on multiple disks with video data blocks out of order. Large volume or intermediate storage of video data, in line with and prior to server buffer memory, is typically accomplished with Redundant Array of Inexpensive Disk (RAID) disk drive systems. The video server orders data blocks, that make up the movie, for transmission from each disk within the disk array to the end user. It is critical that data blocks from multiple disks, representing multiple video streams are sent on time to multiple users so that the end of one data block is seamlessly followed by the next data block in order to present a continuous movie.

Figure 2:
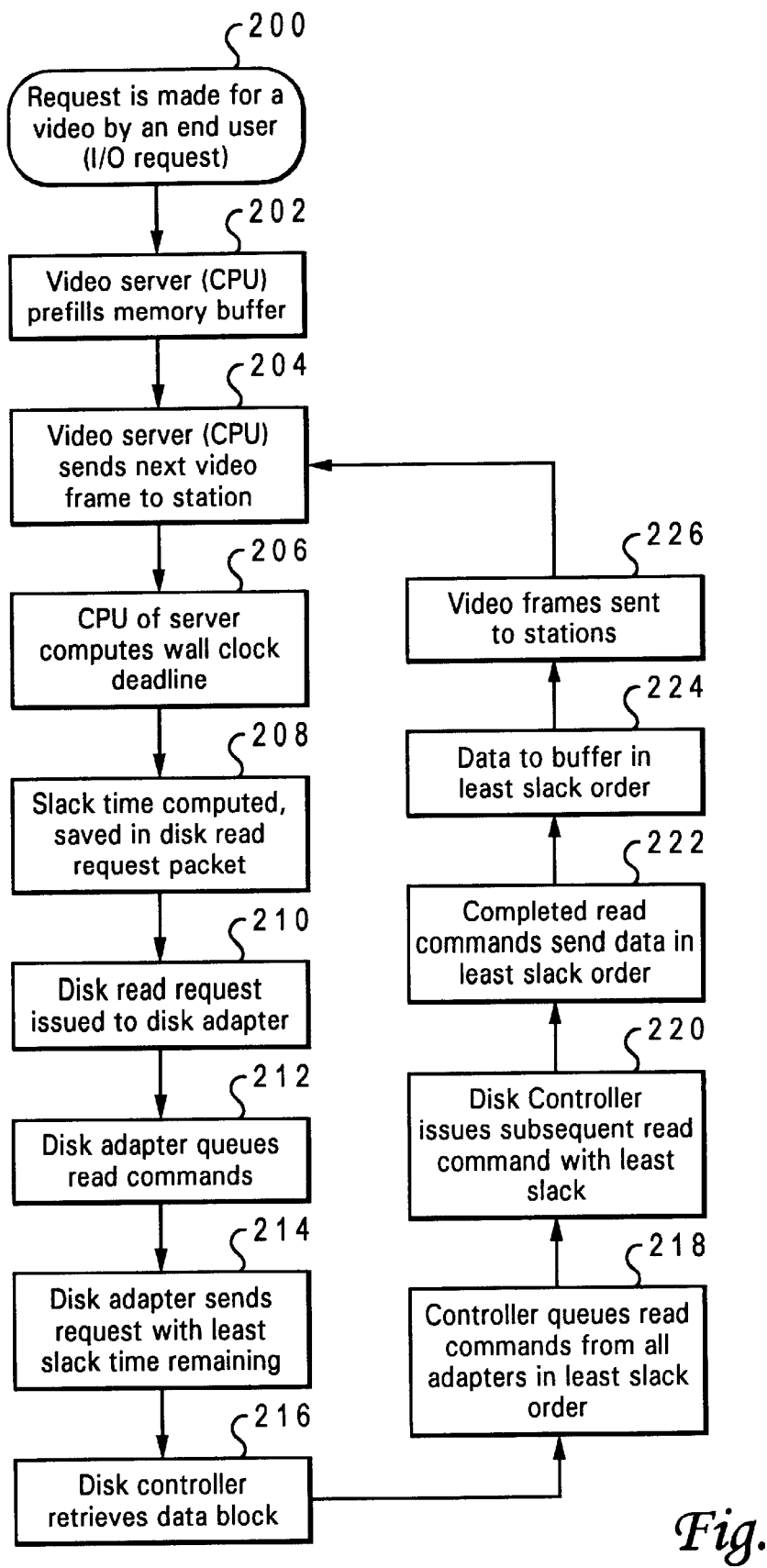
FIG. 2 is a high-level flow diagram of a method in accordance with a preferred embodiment of the present invention.

Referring now to FIG. 2, a high-level flow diagram of a method for prioritizing video frame retrieval in a shared disk cluster in accordance with a preferred embodiment of the present invention, is illustrated. The method, or process, should be considered in concert with FIG. 1. FIG. 1 block diagram also shows the scheme which each CPU, disk adapter and disk controller combination employs to jointly prioritize disk requests to minimize missed frame deadlines. The process for providing prioritization begins with step 200, which depicts an end user connecting to a video server and making a request for a movie (video stream). The process continues to step 202, which illustrates the video server prefilling the memory buffer with data frames of the movie request. The process then proceeds to step 204, which depicts the video server sending the next frame to the requesting station. Next, the process passes to step 206 which illustrates the CPU of each connected server computing "wall clock" time (real time) deadline, which is the time the next disk block containing the next frame or set of sequential frames must be resident in the memory buffer.

The process then proceeds to step 208, which depicts the CPU computing "slack time." Slack time is saved to each disk read request command packet (see FIG. 4) and is equal to deadline time less the current time at which the command packet is sent to the disk adapter. The process next passes to step 210, which depicts the disk read request being issued to the disk adapter. The process continues to step 212, which illustrates read commands being queued in the disk adapter. While in the disk adapter queue, slack time of each read command is regularly decremented so that the waiting time of the read command in queue is reflected. The process then passes to step 214, which depicts a disk controller requesting another command and the disk adapter sending a read command having the least slack time remaining.

The process continues to step 216, which illustrates a disk controller retrieving a data block associated with the read command. The process proceeds to step 218, which depicts disk controllers queuing read commands for the disk storage system from all CPU adapters in least slack time order. As described in step 212, slack time is regularly decremented by the time the command remains in queue in the disk controller to reflect the waiting time in the queue. Read requests from CPU 1 and CPU 2 (see FIG. 1) are then sequenced by least slack time. Next the process passes to step 218, which illustrates the disk drive completing the current read command and the disk controller issuing another read command, having the next least slack time, to the disk arm. The process then proceeds to step 220, which depicts completed read commands sending the data to the disk adapter in least slack time order.

The process continues to step 222, which illustrates data being received by the buffer in least slack time order. The process then passes to step 224, which depicts video frames sent by CPUs in the video server from the buffer to a user station.

Even though the process depicts transmitting data from a single server to a single station, there may be multiple video streams through the same server to multiple stations. The frames are entered into the buffer in slack time order instead of first come, first serve or nearest track order (elevator order). This procedure allows the server to provide data streams with fewer missed frame deadlines and therefore fewer dropped frames thus, providing a more consistent viewing. Also, since there is less variance in disk read response times, higher disk I/O rates result and less memory buffering is required; reducing cost. Less memory buffering also provides that first frame startup time is shorter for the viewer.

Figure 3:
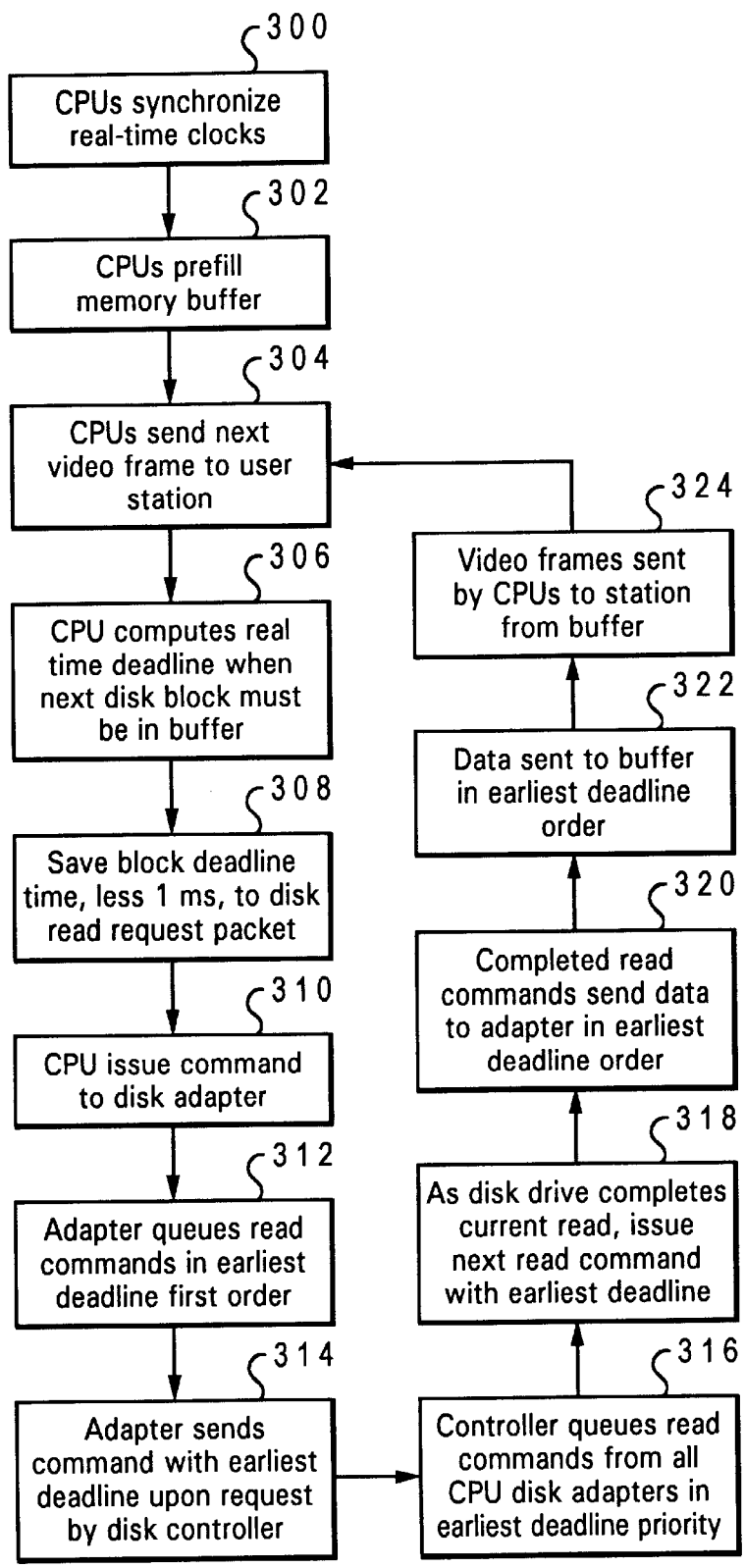
FIG. 3 depicts a high-level flow diagram of a modification of the method in accordance with a preferred embodiment of the present invention.

Referring to FIG. 3, a method for prioritizing video frames utilizing earliest frame deadline, in accordance with a preferred embodiment of the present invention, is depicted. The process begins with step 300, which depicts the CPUs in the video servers synchronizing real time clocks within one millisecond (ms) utilizing a known method such as Network Time Service. The process then proceeds to step 302, which illustrates a video server prefilling the memory buffer with data frames of a movie request from a user station. The process then proceeds to step 304, which depicts the video server sending the next frame to the requesting station. Next, the process passes to step 306 which illustrates the CPU of each connected server computing "wall clock" time (real time) deadline, which is the time the next disk block must be resident in the memory buffer. The process then continues to step 308, which depicts the CPU saving block deadline time, less one millisecond synchronizing error, in a disk read request packet. Next the process passes to step 310, which illustrates the disk adapter queuing read commands in "earliest deadline, transmitted first" order. Using real-time to schedule data packets eliminates the need to account for time in queue.

The process then proceeds to step 312, which depicts read commands being queued in earliest deadline order. Next the process continues to step 314, which illustrates the disk controller completing a command and requesting another command. A read command with the earliest deadline time is then sent to the disk controller. The process passes to step 316, which depicts disk controller queuing read commands from ALL CPU disk adapters. The commands are queued in "earliest deadline, transmitted first" order. When a disk drive regulated by the disk controller completes a current read command, the process proceeds to step 318, which depicts the disk controller issuing the next read command, with earliest deadline to the disk drive arm.

The process then passes to step 320, which illustrates completed read commands sending data to the disk adapter in earliest deadline time order. The process continues to step 322, which depicts data being received by the buffer in earliest deadline time order. The process then passes to step 324, which illustrates video frames sent by CPUs in the video server from the buffer to a user station via a communications network.

Though the process depicts transmitting data from a single server to a single station, there may be multiple video streams through the same server to multiple stations. The frames are entered into the buffer in earliest deadline time order instead of first come first serve or nearest track order (elevator order). This allows the server to provide data streams with fewer missed frame deadlines, and therefore fewer dropped frames, thus providing more consistent viewing. Also, since there is less variance in disk read response times, higher disk I/O rates result and less memory buffering is required, thus reducing cost. Less memory buffering also indicates first frame startup time is shorter for the viewer.

Figure 4:
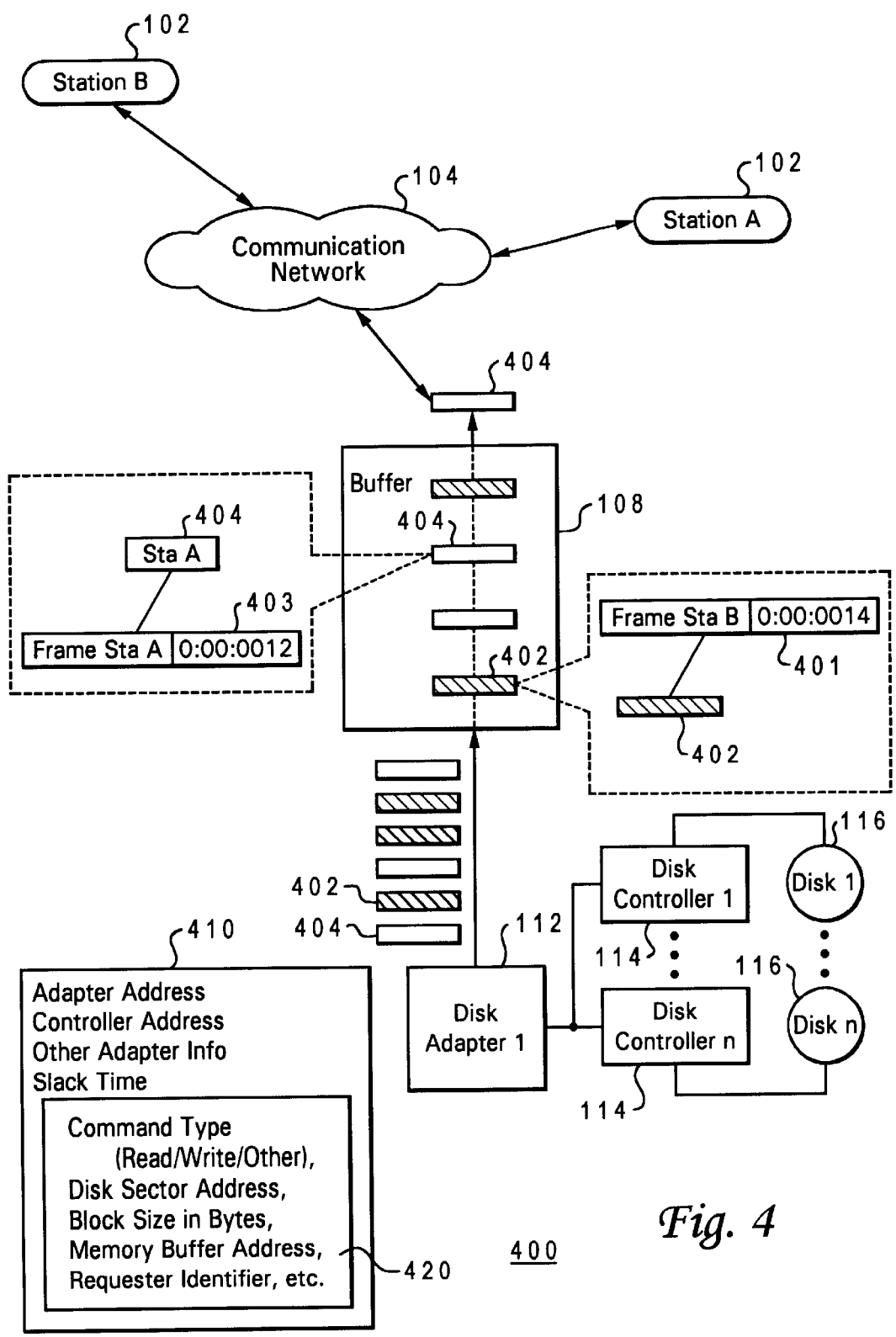
FIG. 4 is a high-level block diagram of the process of scheduling frame packets in accordance with a preferred embodiment of the present invention.

Referring now to FIG. 4, a high-level block diagram of the process of ordering frame packets in accordance with a preferred embodiment of the present invention, is illustrated. Disk.command packet 400 comprises a disk adapter routing packet 410 containing a disk controller command packet 420. Both packets are prepared by a disk driver software portion of a typical CPU resident operating system. The disk adapter routing packet 410 is modified to include slack time (add or modify a 2 byte field) or deadline time stamp (provide an 8 byte field in adapter packet for a time stamp). The slack time or deadline time stamp which is read and updated by disk adapter microcode is modified to send commands to shared disk controllers 114 in least slack time order.

As disk adapter routing packet 410 arrives at the addressed disk controller 114, modified microcode in disk controller 114 updates the slack time as previously described, and issues commands to disk head (not shown) in least slack time order. Earliest deadline time processing is as described above, except that earliest deadline time need not be updated.

After command packet 420 retrieves the data requested, disk controller 114 sends routing packet 410, containing command packet 420, back to disk adapter 112 which then routes the packets retrieved to memory buffer 108. Video data packet streams for different stations (users) are depicted in FIG. 4 with data frame packets 404 intended for Station A 102 and data frame packets 402 intended for Station B 102. As shown, a data frame packet 404 for user A contains the data frame for station A and a deadline time 403 of 12 milliseconds. A data frame packet 402 for user B contains the data frame for station 102 B, and deadline time 401 of 14 milliseconds. The data frame packet shown between packets 402 and 404 has a deadline time set between 12 and 14 milliseconds.

Scheduling time critical video data packets according to time allows for efficient transmittal of data frames having no visible delay between frames. Higher disk read rates are accomplished with fewer missed frame deadlines. Utilizing either slack time or deadline time, worst case disk response times are reduced for retrieving disk reads associated with multiple video streams originating from a plurality of video'servers.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal and switching bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for reducing data transmission errors caused by video frame data delays, comprising the steps of:
   computing a slack time for an Input/Output (I/O) request;
   computing subsequent slack times for subsequent I/O requests;
   modifying said I/O requests by attaching said slack time to said I/O request; and
   scheduling said modified I/O request with similarly modified subsequent I/O requests based on said slack time.

2. The method of claim 1, further comprising:
   determining real-time clock time.

3. The method of claim 1, further comprising:
   queuing said modified I/O requests according to least slack time, wherein said modified I/O requests are video data I/O requests.

4. The method of claim 1, further comprising:
   routing said modified I/O requests to a data storage system, wherein said modified I/O requests are handled according to a least slack time.

5. The method of claim 1, further comprising:
   sending data, ordered by said I/O request, to a buffer wherein said data is scheduled according to a least slack time.

6. The method of claim 1, further comprising:
   transmitting said data ordered by I/O request to a station requesting said data.

7. An apparatus for reducing data transmission errors caused by video frame data delays, comprising:
   computing means for computing a slack time for an I/O request;
   means for computing subsequent slack times for subsequent I/O requests;
   means for modifying said I/O requests by attaching said slack time to said I/O request; and cataloging means for scheduling said I/O request with said subsequent I/O requests based on said slack time.

8. The apparatus of claim 7, further comprising:

timing means for determining real-time clock time.

9. The apparatus of claim 7, further comprising:

data scheduling means for queuing said modified I/O requests according to a least slack time, wherein said modified I/O requests are video data I/O requests.

10. The apparatus of claim 7, further comprising:

means for routing said modified I/O requests to a data storage system, wherein said modified I/O requests are handled according to a least slack time.

11. The apparatus of claim 7, further comprising:

transmitting means for sending data ordered by said I/O request to a buffer wherein said data is scheduled with other data according to a least slack time.

12. The apparatus of claim 7, further comprising:

means for transmitting said data ordered by I/O request to a station requesting said data.

13. A computer program product, having instructions on a computer readable medium for reducing data transmission errors caused by video frame data delays, comprising:

instructions within said computer readable medium for computing a slack time for an I/O request;

instructions within said computer readable medium for computing subsequent slack times for subsequent I/O requests;

instructions within said computer readable medium for modifying said I/O request and said subsequent I/O requests by attaching said slack time; and instructions within said computer readable medium for scheduling said I/O request with said subsequent I/O requests based on said slack time attached to each I/O request.

14. The program product of claim 13, further comprising:

instructions within said computer readable medium for determining real-time clock time.

15. The program product of claim 13, further comprising:

instructions within said computer readable medium for queuing said modified I/O requests according to a least slack time, wherein said modified I/O requests are video data I/O requests.

16. The program product of claim 13, further comprising:

instructions within said computer readable medium for routing said modified I/O requests to a data storage system, wherein said modified I/O requests are handled according to a least slack time.

17. The program product of claim 13, further comprising:

instructions within said computer readable medium for sending data ordered by said I/O request to a buffer wherein said data is ordered according to a least slack time.

18. The program product of claim 13, further comprising:

instructions within said computer readable medium for transmitting said data ordered by I/O request to a station requesting said data.

* * * * *